United States Patent
Xian et al.

(10) Patent No.: US 12,468,568 B2
(45) Date of Patent: Nov. 11, 2025

(54) CONTROL METHOD, CONTROL APPARATUS, AND ELECTRONIC DEVICE

(71) Applicant: Lenovo (Beijing) Limited, Beijing (CN)

(72) Inventors: Dayang Xian, Beijing (CN); Zhijian Mo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 587 days.

(21) Appl. No.: 17/691,104

(22) Filed: Mar. 9, 2022

(65) Prior Publication Data

US 2023/0094449 A1 Mar. 30, 2023

(30) Foreign Application Priority Data

Sep. 30, 2021 (CN) .......................... 202111159234.7

(51) Int. Cl.
| | |
|---|---|
| *G06F 9/48* | (2006.01) |
| *G06F 3/048* | (2013.01) |
| *G06F 3/0481* | (2022.01) |
| *G06F 3/04817* | (2022.01) |
| *G06F 9/54* | (2006.01) |
| *G09G 5/14* | (2006.01) |

(52) U.S. Cl.
CPC .............. *G06F 9/485* (2013.01); *G06F 3/048* (2013.01); *G06F 3/0481* (2013.01); *G06F 3/04817* (2013.01); *G06F 9/48* (2013.01); *G06F 9/4806* (2013.01); *G06F 9/4843* (2013.01); *G06F 9/4881* (2013.01); *G06F 9/542* (2013.01); *G09G 5/14* (2013.01); *G09G 2320/0686* (2013.01); *G09G 2320/08* (2013.01); *G09G 2360/04* (2013.01)

(58) Field of Classification Search
CPC .... G06F 3/048; G06F 3/0481; G06F 3/04817; G06F 9/48; G06F 9/4806; G06F 9/4843; G06F 9/485; G06F 9/4881; G06F 9/542; G06G 2320/0686; G06G 2320/08; G06G 2360/04

See application file for complete search history.

(56) References Cited

U.S. PATENT DOCUMENTS

| 7,123,945 B2 * | 10/2006 | Kokubo ............ H04M 1/72403 345/169 |
|---|---|---|
| 10,180,767 B2 * | 1/2019 | Lee ........................ G06F 3/0486 |
| 2007/0039005 A1 * | 2/2007 | Choi ....................... G06F 9/451 718/107 |
| 2016/0048299 A1 * | 2/2016 | Sirpal ................... G06F 3/0486 715/761 |
| 2016/0139765 A1 * | 5/2016 | Jeon ........................ G09G 5/14 715/790 |
| 2017/0075539 A1 * | 3/2017 | Borromeo ........... G06F 3/04812 |
| 2019/0354252 A1 * | 11/2019 | Badr ...................... G06F 3/0484 |
| 2020/0249897 A1 * | 8/2020 | de Paz ................ G06F 3/04883 |

* cited by examiner

*Primary Examiner* — Charles M Swift
(74) *Attorney, Agent, or Firm* — ANOVA LAW GROUP, PLLC

(57) ABSTRACT

A control method includes obtaining a first task content and, in response to detecting that a first display area outputs a second task content, mapping the first task content to a second display area for output. The first display area and the second display area are different display areas in a same display screen, or the first display area and the second display area are on different display screens and each include at least a partial display area of one of the different display screens.

17 Claims, 13 Drawing Sheets

CONTROL METHOD, CONTROL APPARATUS, AND ELECTRONIC DEVICE

CROSS-REFERENCE TO RELATED APPLICATION

This application claims priority to Chinese Patent Application No. 202111159234.7, filed on Sep. 30, 2021, the content of which is incorporated herein by reference in its entirety.

TECHNICAL FIELD

The present disclosure generally relates to the field of electronic technologies and, more particularly, to a control method, a control apparatus, and an electronic device.

BACKGROUND

When an electronic device such as a smart phone, a notebook computer, or a tablet computer works, contents of a currently executed task are usually displayed on a display screen. During this period, if the electronic device generates or receives a new task, a user usually chooses to ignore the new task, or interrupts the currently executed task and switches to the new task for execution. Contents of the new task are displayed through the display screen to meet the user's operation requirements for the new task.

When the electronic device is in a multitasking state, the user can only select one task to execute at the same time. The user needs to switch constantly, which is very troublesome and reduces the efficiency of multitasking execution.

SUMMARY

In accordance with the disclosure, there is provided a control method including obtaining a first task content and, in response to detecting that a first display area outputs a second task content, mapping the first task content to a second display area for output. The first display area and the second display area are different display areas in a same display screen, or the first display area and the second display area are on different display screens and each include at least a partial display area of one of the different display screens.

Also in accordance with the disclosure, there is provided an electronic device including at least one memory storing a program and at least one processor configured to execute the program to obtain a first task content and, in response to detecting that a first display area outputs a second task content, map the first task content to a second display area for output. The first display area and the second display area are different display areas in a same display screen, or the first display area and the second display area are on different display screens and each include at least a partial display area of one of the different display screens.

BRIEF DESCRIPTION OF THE DRAWINGS

To clearly illustrate the embodiments of the present disclosure, the accompanying drawings that need to be used in the description of the embodiments are described briefly below. The following drawings are merely examples for illustrative purposes according to various disclosed embodiments and are not intended to limit the scope of the present disclosure. For those ordinary skilled in the art, other drawings can also be obtained from the provided drawings without any creative effort.

DETAILED DESCRIPTION OF THE EMBODIMENTS

Regarding the technical problems described in the background section of the present disclosure, it is found that an operating system of an electronic device can complete a single-focus task at the same time. Correspondingly, when the electronic device obtains a new task, it needs to exit the current task or ignore the new task, which cannot satisfy the user's requirements of multi-task control needs of electronic devices. To realize a multi-task working mode of the electronic device, the present disclosure provides technical solutions to use different display areas to meet the task content display requirements of different tasks. For example, a display screen may be divided into multiple display areas. Or, multiple display screens may be used to display contents of different tasks, and each display screen may be used as a display area. Correspondingly, the contents of different tasks may be displayed through different display areas of the same display screen, or different display areas formed by different display screens, to meet the application requirements of electronic devices in the multitasking state. Correspondingly, it may not be required to quit one task for executing another task. The task processing efficiency may be improved, and the user's experience of using the electronic device may be improved.

Hereinafter, embodiments and features consistent with the disclosure will be described with reference to drawings. Various modifications may be made to the embodiments of the present disclosure. Thus, the described embodiments should not be regarded as limiting, but are merely examples. Those skilled in the art will envision other modifications within the scope and spirit of the present disclosure.

Figure 1:
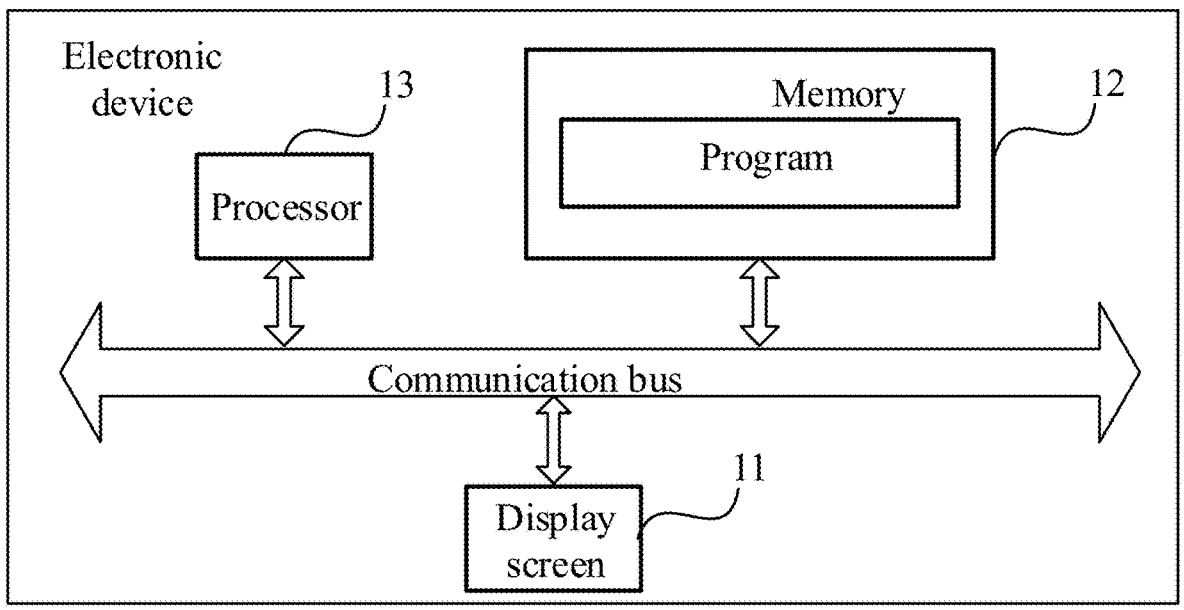
FIG. 1 is a schematic hardware structural diagram of an example electronic device applicable to a control method consistent with the present disclosure.

The present disclosure provides an electronic device. FIG. 1 is a schematic hardware structural diagram of an example electronic device applicable to a control method, provided by one embodiment of the present disclosure. The electronic device may include, but is not limited to, a smart phone, a tablet computer, a notebook computer, or a desktop computer. As shown in FIG. 1, the electronic device includes: at least one display screen 11 (the electronic device shown in FIG. 1 including one display screen 11 is used as an example only to illustrate the present disclosure), at least one memory 12, and at least one processor 13. In one embodiment, the electronic device may include one display screen 11, one memory 12, and one processor 13. The display screen 11, the memory 12, and the processor 13 may be connected to a communication bus to realize mutual data transmission through the communication bus. The present disclosure has no limit on the connection method of these members.

The display screen 11 may include a touch-type display screen or a non-touch-type display screen. The present disclosure has no limit on the screen type. It can be understood that the display screen 11 may be configured to display task contents received by the electronic device from other electronic devices, and may also display task contents generated by the electronic device itself, such as outputting video files, game contents, or text information. This may be configured according to actual situations, and the display working principle of the display screen 11 is not described in detail in the present disclosure.

Figure 2A:
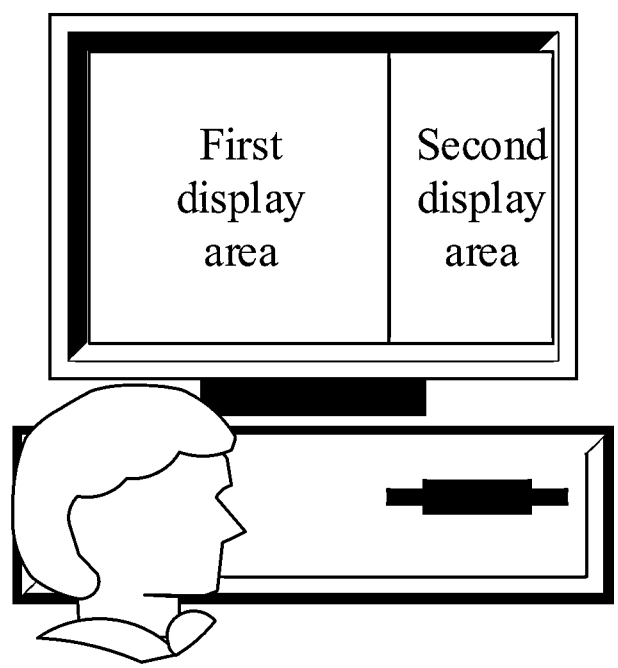
FIG. 2A is a schematic diagram showing an application scenario of a single-screen electronic device applicable to a control method consistent with the present disclosure.

In one embodiment, the electronic device may be in a multi-task state. To meet the user's requirement for simultaneous multi-task processing, in the present disclosure, the entire display area of the display screen 11 may be split into multiple display areas, and the electronic device may realize the display requirements for different task contents through the different display areas. For example, in one embodiment as shown in FIG. 2A, the multiple display areas include a first display area and a second display area. The embodiments shown in FIG. 2A is used as an example to illustrate the present disclosure, and does not limit the scope of the present disclosure. The present disclosure has no limit on the manner for configuring one display screen 11 into multiple display areas, and also has no limit on the display modes of multiple display areas (such as horizontal tile display, vertical tile display, etc.), which can be determined according to different task types.

In some other embodiments, to expand the display area of the electronic device, the electronic device may include a plurality of display screens 11. For example, in the embodiments shown in FIG. 2B and FIG. 2C, the electronic device is a dual-screen electronic device including two display screens. One display screen 11 may be disposed on each of a B-surface and C-surface of the electronic device. The two display screens may be denoted as the first display screen and the second display screen, respectively. In this case, at least a portion of the display area of the first display screen may be used as the first display area, and at least a portion of the display area of the second display screen may be used as the second display area.

Figure 2B:
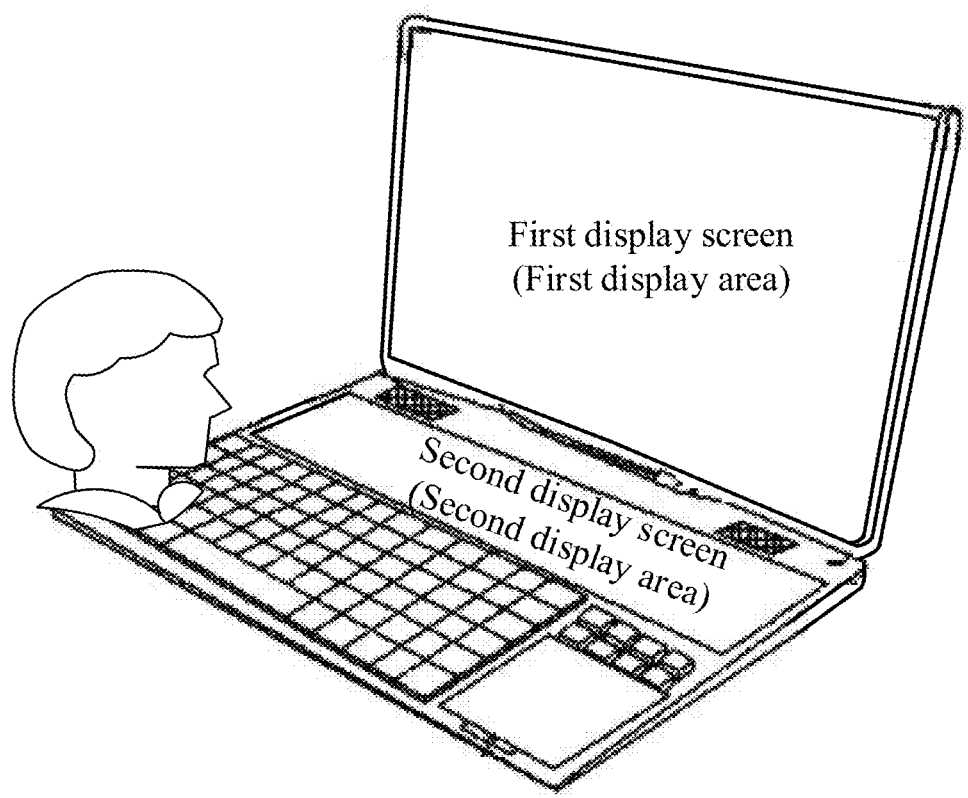
FIG. 2B is a schematic diagram showing an application scenario of a dual-screen electronic device applicable to a control method consistent with the present disclosure.
Figure 2C:
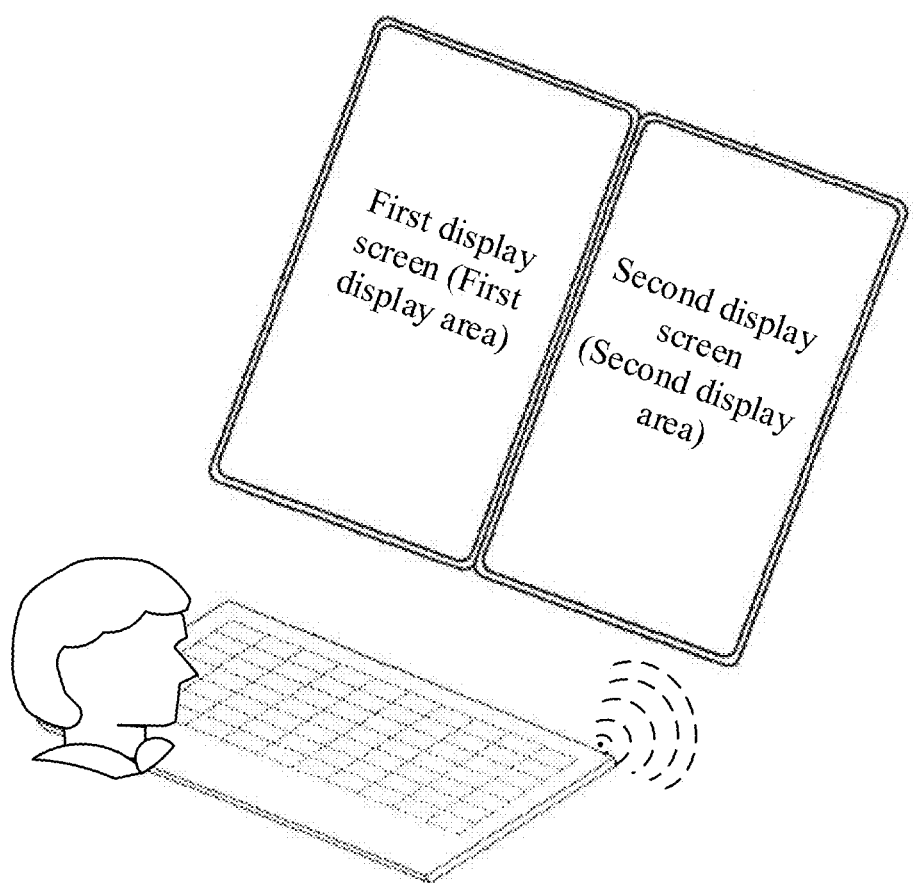
FIG. 2C is a schematic diagram showing another application scenario of a dual-screen electronic device applicable to a control method consistent with the present disclosure.

The embodiments shown in FIG. 2B and FIG. 2C are used as examples to illustrate the present disclosure, and do not limit the scope of the present disclosure. For example, in some other embodiments, the electronic device may include three or more display screens. For another example, for a dual-screen electronic device, the display screens may be disposed on surfaces other than the B-surface and C-surface. The present disclosure has no limit on the number of or the configuration of the plurality of display screens in the electronic device which includes but is not limited to the embodiments shown in FIG. 2B and FIG. 2C. The control method provided by the present disclosure may be applied to any type of multi-screen electronic devices.

The implementation of displaying different task contents in multiple display screens of the present disclosure is not limited to one electronic device provided with a plurality of display screens. In some other embodiments, the plurality of display screens may be provided on different electronic devices. For example, in one embodiment shown in FIG. 2D, since the display area of the display screen of the notebook computer is limited, an external display screen may be connected, to extend the display area of the notebook computer. The control and implementation of the display using the plurality of display screens in the present embodiment is similar to previous embodiments, and will not be described in detail here.

In the present disclosure, by using the electronic device with different structures in the previous embodiments, to avoid input control interference between multiple tasks, different input control logic may be mapped to corresponding display areas (the different display areas may be located on one same display screen, or on different display screens of the same electronic device or different electronic devices), especially in application scenarios where multiple display areas share a same input/output device.

In one embodiment shown in FIG. 2B, in a scenario where the user uses the electronic device to edit a text file, the first display screen with a larger display area may display the text content. At the same time, a keyboard, a mouse, a touch plate, or a touch screen of the electronic device may also be occupied. During the file editing process, the electronic device may receive a notification message (such as a message sent by a social application, a phone, or a screen projection request from another electronic device). To avoid interference with the user's file editing task output on the first display screen and to process the notification message, the notification message may be mapped to the second display area of the second display screen for output. When the user needs to give a reply, since the above-mentioned input devices are occupied, voice input may be mapped to the second display area. Correspondingly, the user may use voice control to reply to the notification message.

The control application scenario of multiple display areas is not limited to the above description, and can be determined according to user application requirements, and the structure of multiple display areas suitable for the application scenarios is not limited to the electronic device with the dual-screen structure shown in FIG. 2B.

The memory 12 may be configured to store a program for realizing the control method provided by various embodiments of the present disclosure. The processor 13 may load and execute the program stored in the memory 12 to realize the control method provided by various embodiments of the present disclosure. The implementation process may be made reference to, but is not limited to, the following method embodiments.

In one embodiment, the memory 12 may include a high-speed random access memory, or may include a non-volatile memory, for example, at least one magnetic disk storage device or another volatile solid-state storage device. The processor 13 may be a central processing unit (CPU), a digital signal processor (DSP), an application-specific integrated circuit (ASIC), a field programmable gate array (FPGA), or another programmable logic device.

Figure 3:
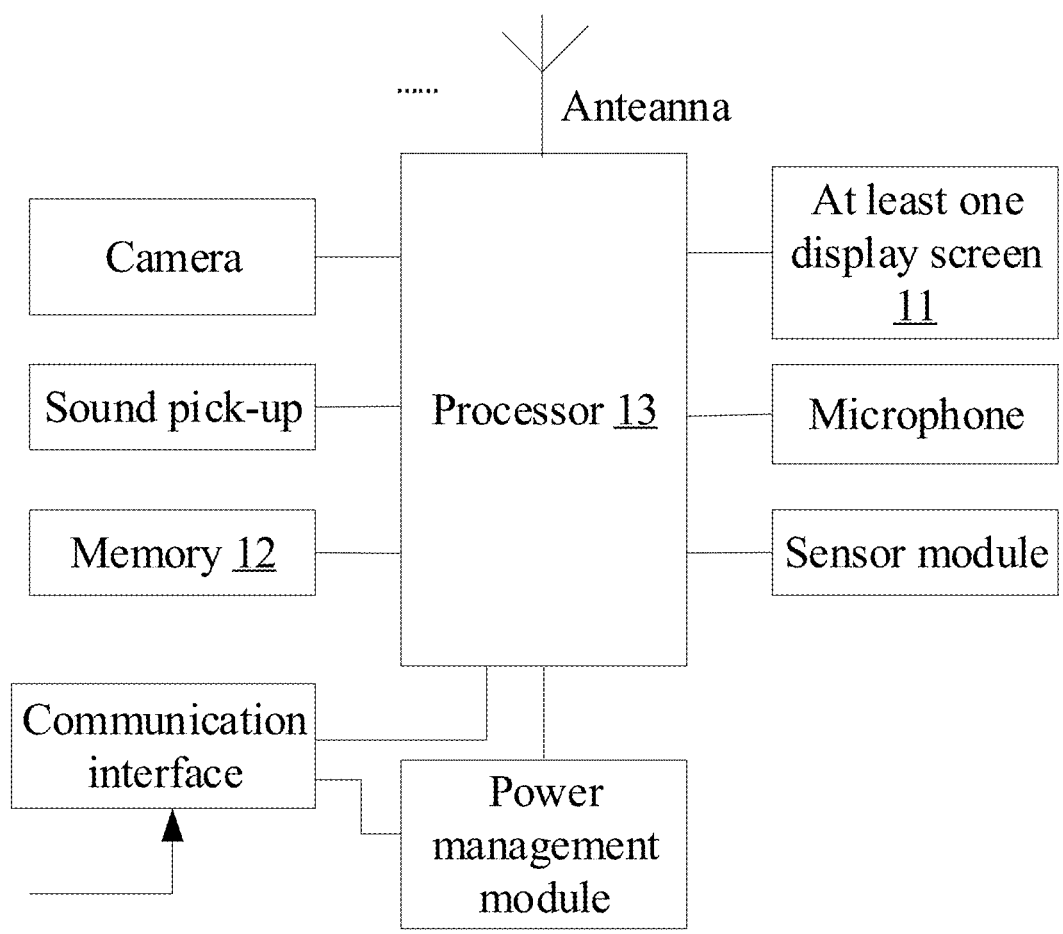
FIG. 3 is a schematic hardware structural diagram of another example electronic device applicable to a control method consistent with the present disclosure.

The electronic device shown in FIG. 1 is used as an example to illustrate the present disclosure, and does not limit the scope of the present disclosure. In practical applications, the electronic device may include more components than those shown in FIG. 1, or some components may be combined. For example, an electronic device in FIG. 3 includes various types of communication interfaces (such as a display expansion interface, a USB interface, a serial/parallel interface, or a multimedia communication interface), a camera, a microphone, a sound pick-up, a power management module, or an antenna. These may be configured according to the product types and their functional requirements, and the present disclosure has no limit on this.

Figure 4:
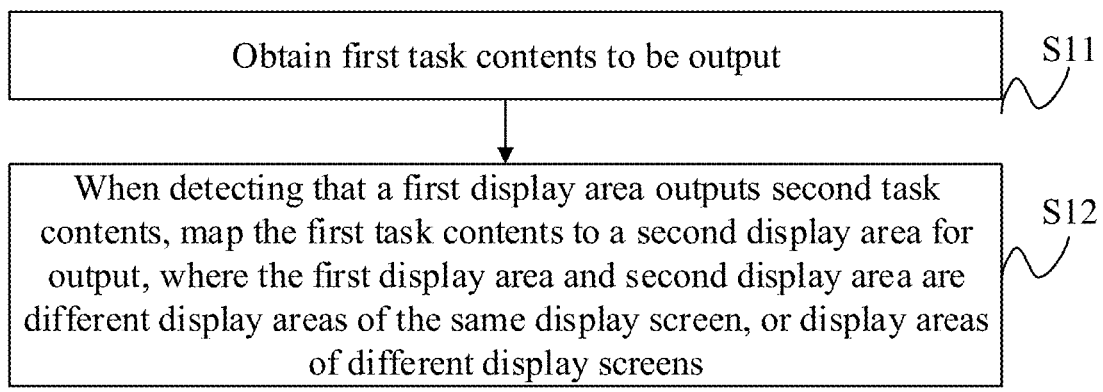
FIG. 4 is a flow chart of an example control method consistent with the present disclosure.

The present disclosure provides a control method. FIG. 4 is a flow chart of an example control method provided by one embodiment of the present disclosure. The control method may be executed by an electronic device. The electronic device may have, but is not limited to the structure described in previous embodiments. In one embodiment, as shown in FIG. 4, the control method includes, but is not limited to, S11 and S12.

At S11, obtain the first task contents to be output.

At S12, when detecting that a first display area outputs second task contents, the first task contents are mapped to a second display area for output.

Figure 2D:
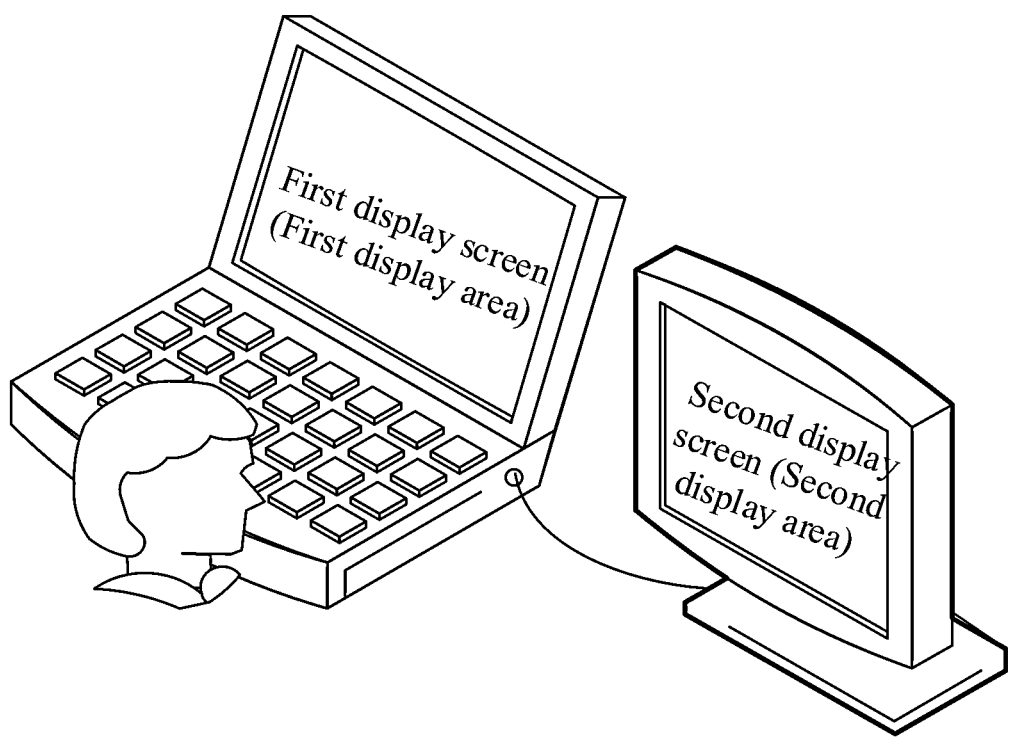
FIG. 2D is a schematic diagram showing an application scenario of an electronic device applicable to a control method consistent with the present disclosure connected to an external display screen.

Combined with the descriptions of the corresponding parts of the above embodiments of the electronic device, the first display area and second display area may be different display areas of the same display screen, as shown in FIG. 2A; or at least parts of the display areas of different display screens, as shown in FIG. 2B, FIG. 2C, and FIG. 2D. Different display screens may be located in the same electronic device or in different electronic devices. The present disclosure has no limit on the relationship between the display screens where the first display area and the second display area are respectively located. The relationship may include, but is not limited to the application scenarios shown in the accompanying drawings.

In the practical application of the electronic device, for the multiple display areas formed in different scenarios described above, one display area may be usually set as the main display area and denoted as the first display area. Other display areas may be secondary display areas and denoted as the second display areas. Correspondingly, the task contents to be output obtained by the electronic device may be preferentially mapped to the first display area for display, but is not limited in this display control method.

In some other embodiments, the mapping relationship between different tasks and different display areas may be pre-configured. Correspondingly, after the electronic device obtains the task contents to be output from any task, it may map the task contents to a corresponding display area for display, according to the mapping relationship. In some embodiments, optionally, the mapping relationship may also output corresponding prompt information on the electronic device, and then a user of the electronic device may configure it. In this case, the configured mapping relationship may be a temporary mapping relationship, and may be deleted after the electronic device is restarted. The present disclosure has no limit on the mapping control for displaying different task contents in different display areas, which may be configured according to the actual situation.

In the present embodiment, the electronic device may obtain a new task and denote it as a first task, and the contents of the first task (namely: first task contents) may need to be output for the user to view and give feedback accordingly. In this case, whether the display area of the display screen of the electronic device, or the display screens of the electronic device and the external display device connected to the electronic device, is outputting the second task contents, that is, the contents of the second task (namely: second task contents) that are different from the first task, may be determined. To avoid interference with the second task contents, the second display area in the display screens of the electronic device or the external display device connected to the electronic device, which is different from the first display area, may be obtained, and the first task contents newly obtained by the electronic device may be mapped to the second display area for output, without need to close the second task or ignore the first task. The application requirements of outputting the respective task contents of the multiple tasks at the same time when the electronic device is in multi-task states may be met, and the task processing efficiency may be improved.

In one embodiment, the first display area and the second display area may be located in the same display screen, in the application scenario of the electronic device as shown in FIG. 2A. When the electronic device outputs the second task contents, the first display area for displaying the second task contents may be a partial display area of the display screen, as shown in FIG. 2A. In another embodiment, the first display area may be a complete display area of the display screen. Correspondingly, after the first task contents of the new task are obtained, the display parameters of the display screen may be adjusted, to reduce the first display area and obtain the second display area. That is, the first display area may be controlled to be adjusted from the complete display area of the display screen to a partial display area of the display screen, as shown in FIG. 2A. The implementation method is not described in the present disclosure.

In some other embodiments, the first display area and second display area may be located in different display screens. The present disclosure does not limit whether the two display screens are located in one same electronic device. When the first display area of the first display screen of the electronic device (that is, at least a part of the display area of the first display screen) outputs the second task contents, if the electronic device obtains the second task contents to be output, the second task contents to be output may be directly mapped to the second display screen, as shown in FIG. 2B, FIG. 2C, and FIG. 2D. The newly obtained first task contents may be displayed in the second display area of the second display screen (that is, at least a part of the display area of the second display screen). The implementation method of the mapping display between the new task content and the display area is not described in the present disclosure.

When the first task contents are mapped to the second display area for output, the first task contents may be maintained in an output state, and the user may be reminded to view or respond to the first task contents. When the first task contents are the notification contents to be replied to, the display state of the first task contents output by the second display area may be controlled to be in a constant light state, or in a flashing state. The present disclosure has no limit on the implementation of maintaining the first task contents in the output state.

Figure 5:
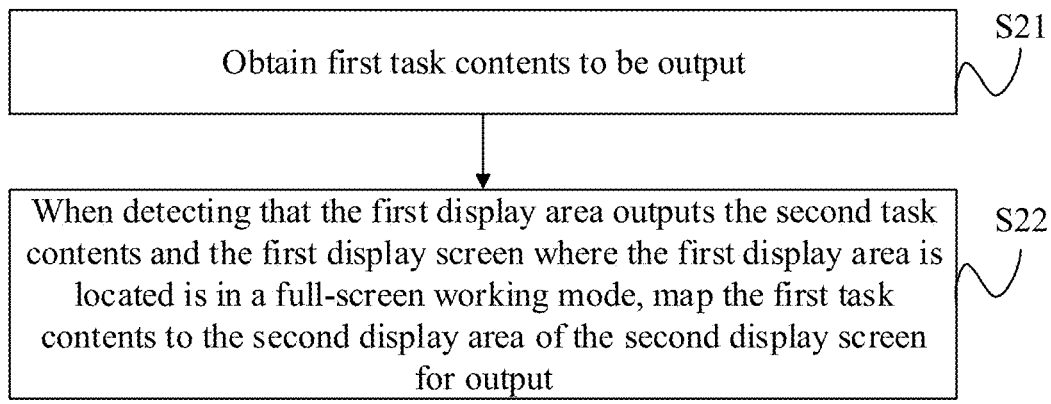
FIG. 5 is a flow chart of another example control method consistent with the present disclosure.

Another embodiment of the present disclosure provides another control method. FIG. 5 is a schematic flowchart of the control method in the present embodiment. This embodiment may be an optional refinement implementation method of the control method provided by above embodiments, but does not limit the implementation method of the present disclosure. In the present embodiment, different task contents may be displayed on different display screens, and the different display screens may be located in the same electronic device or in different electronic devices connected to each other, which is not limited in the present disclosure. As shown in FIG. 5, the method includes S21 and S22.

At S21, obtain the first task contents to be output.

At S22, when it is detected that the first display area outputs the second task contents and the first display screen where the first display area is located is in a full-screen working mode, the first task contents are mapped to the second display area of the second display screen for output.

For example, in the application scenarios which are shown in but are not limited to FIG. 2B, FIG. 2C, and FIG. 2D, when the first display screen of the electronic device is in a full-screen working mode, such as full-screen video viewing, image editing, playing games, or other second tasks, the first display area of the first display screen (that is, the complete display area) may output the second task contents, to meet the user's processing requirements for the second task.

In the scenarios described above, when the electronic device obtains a new task (denoted as the first task), the first task contents may need to be output such that the user can view the first task, but the user may still want to execute the first task. If the first task contents are directly displayed on the first display screen, it may interfere with the second task content. Therefore, in the present disclosure, the first task may be directly mapped to the second display screen and the first task contents may be displayed in the second display area of the second display screen, such that the user may be able to view different task contents at the same time.

Figure 6:
FIG. 6 is a schematic diagram of another application scenario of a dual-screen electronic device applicable to a control method consistent with the present disclosure.

In some other embodiments, in the working state of the electronic device shown in FIG. 6, the first display screen may be in a full-screen working mode, and the first display screen may output multiple task windows (that is, second task windows of a plurality of second tasks), for example, two task windows shown in FIG. 6. A display area corresponding to each task window may be marked as the first display area, that is, multiple task windows may be output in the full-screen mode of the first display screen. Each task window may correspond to a first display area. Correspondingly, the newly received first task may be mapped to the second display screen in the above-mentioned manner, and the first task contents may be displayed by at least a part of the display area in the second display screen.

In some other embodiments, there may be more display screens in the application scenario. In the process of determining the second display screen mapped to the first task, a display screen in an idle state may be detected and used as the second display screen. And then the first task contents may be displayed in the second display area of the second display screen. The selection method of the second display screen is not described here in detail.

It can be understood that when the application scenario described in the above embodiment is configured with multiple display screens and the first display screen is in a full-screen mode, the display area of at least one task window output by the first display screen may be adjusted in the manner described above, to obtain the second display area for displaying the first task contents. The present disclosure has no limit on the implementation.

Figure 7:
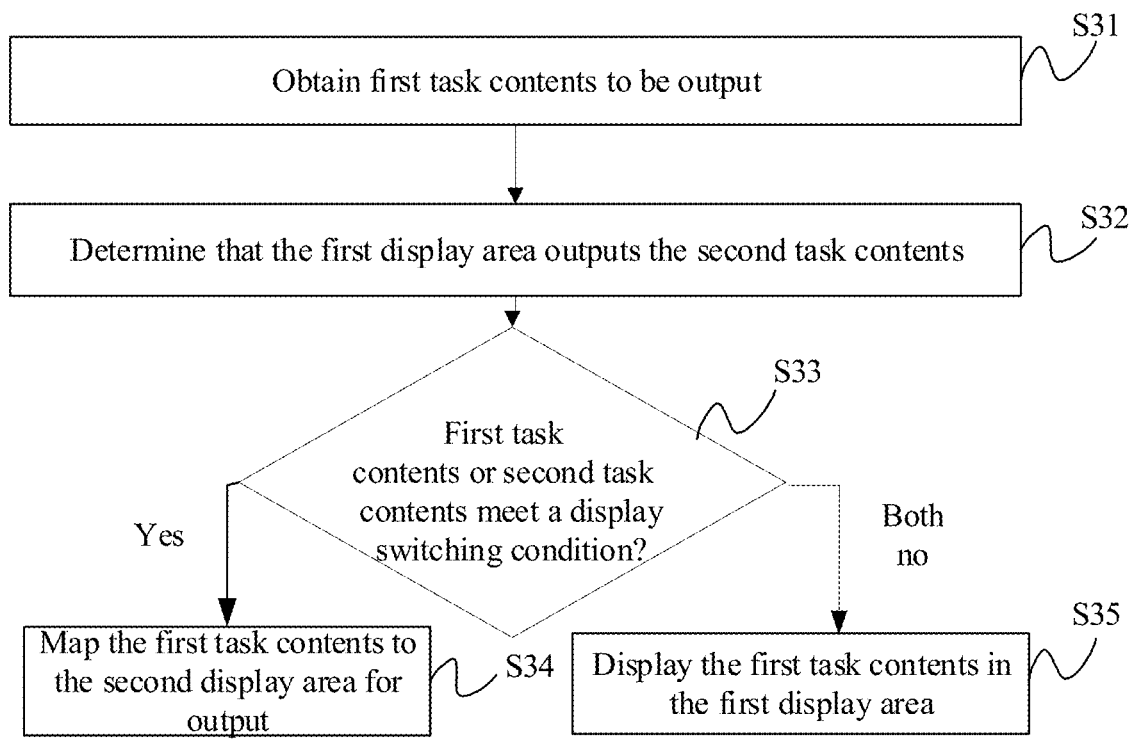
FIG. 7 is a flow chart of another example control method consistent with the present disclosure.

Another embodiment shown in FIG. 7 provides another control method. This embodiment may be another optional refinement implementation method of the control method provided by above embodiments. In the present embodiment, a display switching condition for instructing switching of the display areas of the task contents of different tasks may be preconfigured, to realize the display control of different tasks. As shown in FIG. 7, the method includes S31 to S35.

At S31, obtain the first task contents to be output,

At S32, it is determined that the first display area outputs the second task contents.

For the implementation process of S31 and S32, reference may be made to the descriptions of the corresponding parts of the above embodiments, and details are not repeated.

At S33, it is detected whether the first task contents or the second task contents meet the display switching condition. When the display switching condition is met, S34 is executed. When the display switching condition is not met, S35 is executed.

At S34, the first task contents are mapped to the second display area for output.

In this embodiment, S34 is executed when it is detected that the first task contents or the second task contents meet the display switching condition. That is, if any task contents meet the display switching condition, S34 is executed. The actual situation may be based on the contents of the display switching condition.

At S35, the first task contents are displayed in the first display area.

In one embodiment, that the first task contents or the second task contents satisfy the display switching condition may include, but not be limited to, any one or more of: the first task contents and the second task contents come from different content sources; the first task contents and the second task contents correspond to different tasks of a same content source; the first task contents come from a content source of a first type; or the second task contents come from a content source of a second type. The implementation of S33 may be determined according to the actual requirements of different application scenarios, which is not limited in the present disclosure.

The content source of the first type may be a content source to which the task that needs to be switched to the second display area in the idle state for outputting the task contents belongs, according to the pre-defined requirements based on actual demand. The present disclosure does not limit the content source category of the content source of the first type. Optionally, various notification messages, such as new messages sent or forwarded by a social platform, newly received emails, screen-casting requests from other devices, or other notification messages of new tasks, may be mapped to the second display area for output. The content sources of these task categories may be denoted as the first category of content sources in the present embodiment. The present disclosure has no limit on the first task category.

Correspondingly, after the electronic device obtains the first task contents to be output and determines that the first task contents come from any content source of the first type, such as any of the notification messages listed above, the first task contents may be directly mapped to the second display area for output. Display of the first task contents may be controlled by the method shown in FIG. 7, which is not limited in the present disclosure.

The content source of the second type may be a content source of the second task pre-defined that it does not want to be disturbed when the task contents are output and the task contents of other tasks newly received by the electronic device are directly mapped to the second the second display area for output. That is, during the output of the task contents from the content source of the second type, the electronic device may be instructed to map other received task contents to the second display area for output. The present disclosure has no limit on the representation of the content source of the second type, which can be implemented through but not limited to application categories, such as game applications, video applications, or file editing applications. The first type and the content source of the second types may be flexibly configured according to the user's personal habit, or may be configured during the installation of the electronic device. The present disclosure has no limit on the configuration and implementation of the two types of content sources.

The first display area of the electronic device may be used to display application contents of any category of applications listed above, that is, the second task contents from the content source of the first types. The electronic device may obtain the first task contents and directly display it on the second display area. For the implementation, reference may be made to the description of the corresponding parts of the above embodiments.

The present disclosure has no limit on detection method of which content source the above task contents come from, which may be implemented according to identification information including the task category or content source category. The present disclosure has no limit on this.

Figure 8:
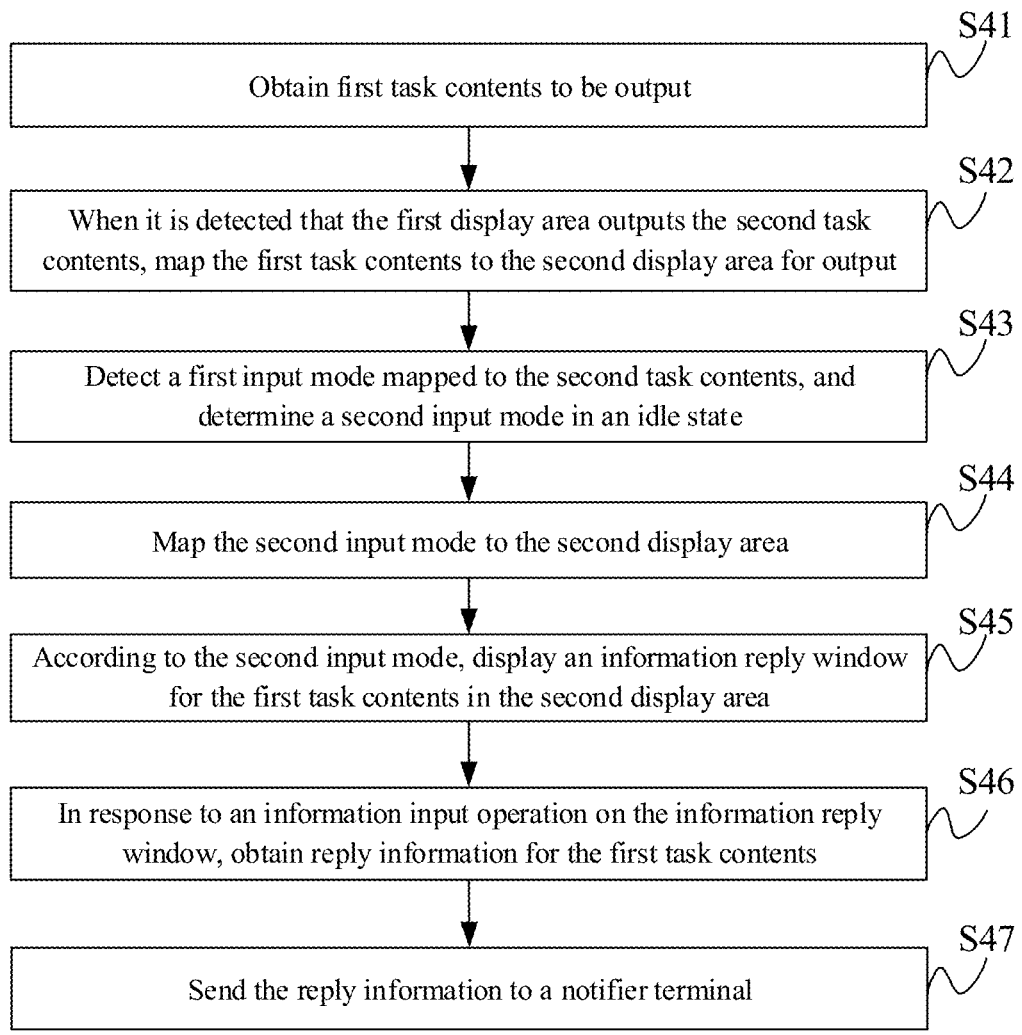
FIG. 8 is a flow chart of another example control method consistent with the present disclosure.

Another embodiment shown in FIG. 8 provides another control method, and the method may be executed by the electronic device. As shown in FIG. 8, the method includes S41 to S45.

At S41, obtain the first task contents to be output.

At S42, when it is detected that the first display area outputs the second task contents, the first task contents are mapped to the second display area for output;

For implementation of S41 and S42, reference may be made to, but is not limited to, the descriptions of the corresponding parts of the above embodiments, which will not be repeated in this embodiment.

At S43, a first input mode mapped to the second task contents is detected, and a second input mode in an idle state is determined.

In practical applications, the input modes of electronic device may be limited, such as keyboard input, touch pad input, touch screen input, or voice input. The implementation of these input modes may occupy one or more input devices of the electronic device, such as keyboards, touch screens, touch pads, sound pick-ups. While the electronic device performs the second task and outputs the second task contents through the first display area, one or more input modes may be required for different second task contents to meet the input control requirements for the second task contents. That is, the first input mode mapped to the second task contents may be one or more input modes supported by the electronic device. The present disclosure has no limit the type and quantity of the first input modes, which may be configured according to the actual situation.

Correspondingly, for the first task contents newly obtained by the electronic device, when the input control is required, the input control logic for the first task contents may need to be different from the input control logic for the second task, to avoid interference with the second task contents. That is, the input mode mapped to the first task contents may be different from the first input mode mapped to the second task contents (that is, the input mode being used by the electronic device to execute the task).

Therefore, when the electronic device obtains the first task contents and determines to output the second task contents through the first display area, the first input mode mapped to the second task contents may be detected, and then it may be determined whether there is a second input mode in an idle state, that is, an input mode that is not mapped to the second task contents, from a variety of input modes supported by the electronic device accordingly. The present disclosure has no limit on the acquisition method of the mapping relationship between the input modes and different task contents. It may be determined by, but is not limited to, the mapping relationship between the display area of the task contents or the display screen where the task contents are located and the input modes.

At S44, the second input mode is mapped to the second display area.

At S45, according to the second input mode, an information reply window for the first task contents is output in the second display area.

At S46, in response to an information input operation on the information reply window, reply information for the first task contents is obtained.

At S47, the reply information is sent to a notifier terminal.

After the above detection, when the electronic device executes the first task, the second input mode in the idle state may be determined and may be mapped to the second display area for output. An execution sequence of switching map of the input and the display switching of the first task contents is not limited in the present disclosure, and is not limited to the execution sequence described in the above steps in this embodiment, which can be adjusted according to actual needs.

In some embodiments, after the second input mode is determined, a second input device that implements the second input mode may be associated with the second display area. For example, the second display area and the first display area may be display areas on different display screens, and the second input device may be mapped to the second display screen where the second display area is located. Correspondingly, the electronic device may be able to respond to the input information output by the second input device, and realize the response control to the first task contents output by the second display screen. That is, after obtaining the input information output by the second input device, the control logic corresponding to the first task contents output by the second display screen may be used to respond to the input information. The control process is not described in detail in this embodiment.

When the first task contents are the notification content to be replied to, such as the various notification messages listed above, the user may be usually required to reply to the notification contents, that is, to feed back the reply information to a notifier. Correspondingly, after the second input mode of the first task contents, that is, any second input mode in the idle state, or a second input mode in the idle state for the first task category determined according to a priority order or a preset correspondence, is determined, the information reply window for replying to the first task contents may be output in the second display area. For example, in the scene shown in FIG. 6, the information reply window for the received notification message is displayed on the second display screen of the C-surface of the notebook computer. The present disclosure has no limit on the layout of the information reply window and its output form in the second display area.

Correspondingly, the user of the electronic device may use the first input mode to realize the input control of the second task contents output from the first display area. At the same time, the user of the electronic device may also use the second input mode to realize the input control of the first task contents output in the second display area. The two input control logics may be independent of each other and may not interfere with each other, which meets the input control requirements of the electronic device in the multi-task working mode at the same time.

For example, in a scenario where the first display area and the second display area are display areas of different display screens, for the control application of the dual-screen electronic device shown in the accompanying drawings, when the user uses the first display screen of the electronic device (that is, the display screen where the first display area is located) to watch a video (that is, the second task contents are video), the sound pickup of the electronic device may be occupied and in a working state, and the voice input mode may be temporarily unavailable. Correspondingly, when the electronic device receives a notification message, the notification contents may be output in the second display area of the second display screen, and the keyboard input mode (or another input mode different from the voice input mode) may be mapped to the second display area. The information reply window of the notification message may be displayed in the second display area, such that the user is able to input the reply information through the keyboard in the information reply window.

In another example scenario, the second task may be a document editing task, and the user may use the first display screen to edit the document. The input control logic of the keyboard, touchpad, and touchscreen of the electronic device may be occupied, and the voice input mode may be mapped to the second display screen. The user may obtain the reply information for the first task contents by the voice input mode. An audio collector such as a sound pickup of the electronic device may be used to collect the user's voice signal, and the voice signal may be recognized by a voice recognition engine to obtain a voice control instruction for the first task contents. In response to the voice control instruction, the information reply window or reply information of the first task contents may be output, and the reply information may be sent to the notifier terminal.

The application scenarios of the control method shown in FIG. 8 is not limited to the above scenarios. The implementation of the control method in other scenarios is similar and is not repeated here.

Figure 9:
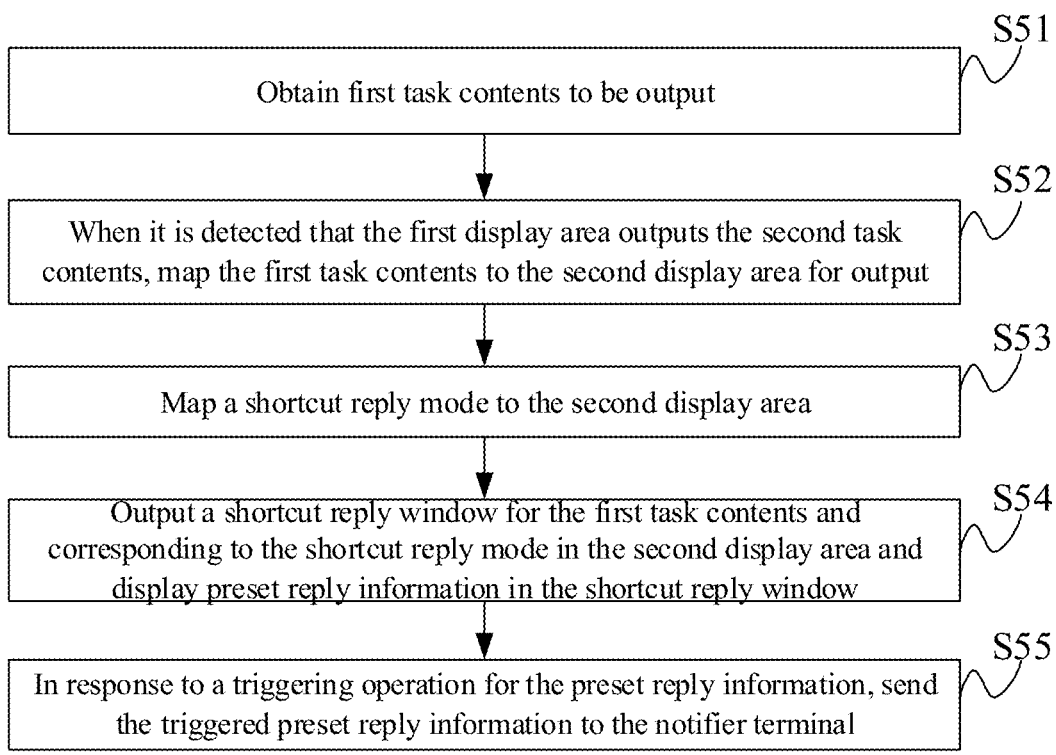
FIG. 9 is a flow chart of another example control method consistent with the present disclosure.

Another embodiment shown in FIG. 9 provides another control method. This embodiment may be executed by the electronic device. In the present embodiment, a shortcut reply mode may be mapped to the second display area, to achieve a shortcut response to the notification contents to be replied to. The present disclosure is not limited to the method for realizing the shortcut reply described in this embodiment. As shown in FIG. 9, the method includes S51 to S55.

At S51, obtain the first task contents to be output.

At S52, when it is detected that the first display area outputs the second task contents, the first task contents are mapped to the second display area for output.

For the implementation process of S51 and S52, reference may be made to, but not limited to, the descriptions of the corresponding parts of the above embodiments, which will not be repeated in this embodiment.

At S53, the shortcut reply mode is mapped to the second display area.

At S54, a shortcut reply window for the first task contents and corresponding to the shortcut reply mode is output in the second display area, and preset reply information is displayed in the shortcut reply window.

At S55, in response to a triggering operation for the preset reply information, the triggered preset reply information is sent to the notifier terminal.

In a scenario where the first task contents are the notification content to be replied to, such as various notification messages listed above, the shortcut reply mode may be adopted to implement a reply operation for the first task contents. Therefore, after determining that the first task contents are mapped to the second display area, the shortcut reply mode may be directly mapped to the second display area, such that the preset reply information, such as "It is inconvenient now" or "Will contact you later," is able to be called directly and be sent to the notifier terminal automatically. In some other embodiments, the user may select an appropriate preset reply message from multiple preset reply messages and send it to the notifier terminal, which is not limited in the present disclosure.

The present disclosure has no limit on the contents of the preset reply information which may be flexibly adjusted according to the user's personal habits and preferences. In some other embodiments, the corresponding preset reply information for different types of tasks may be preset in advance. Correspondingly, after obtaining the task contents of a type of task, the corresponding preset reply information may be called directly for feedback, and the implementation process is not described here in detail.

In the practical application where the first task is mapped to the second display area for output, when there is a second input mode in the idle state, a prompt message for selecting a reply mode may be output to instruct the user to select a shortcut reply mode or a precise reply mode. When the shortcut reply mode is selected, the shortcut reply to the first task contents may be realized according to the control method shown in FIG. 9. When the precise reply mode is selected, a second input mode may be adopted to achieve the input control of the first task contents through the control method in FIG. 8. The implementation method of the selection of the reply mode of the electronic device is not described in detail in the present disclosure.

In some other embodiments, according to the input mode detection method described above, it may be determined that the second task contents map all input modes, that is, there is no second input mode in the idle state. Correspondingly, the shortcut reply mode may be mapped to the second display area according to the method described above, such that the reply information of the first task contents may be obtained and fed back to the notifier terminal.

For example, for the dual-screen electronic device shown in the accompanying drawings, when the user uses the first display screen to enter the full-screen mode to play games, input devices such as keyboards, touchpads, touchscreens, or sound pickups of the electronic device may be occupied. Correspondingly, the input modes supported by the electronic device may be all mapped to the second task contents output in the first display screen, and these input devices may be no longer available to obtain the input information for the first task contents. Therefore, the second display screen may be controlled to switch to the shortcut reply mode, and the shortcut reply window may be output, to realize a shortcut reply to the first task contents. The implementation process will not be described in detail. It should be noted that the implementation process of the control methods for electronic devices with other structures are similar, and will not be described in detail in the present disclosure.

Figure 10:
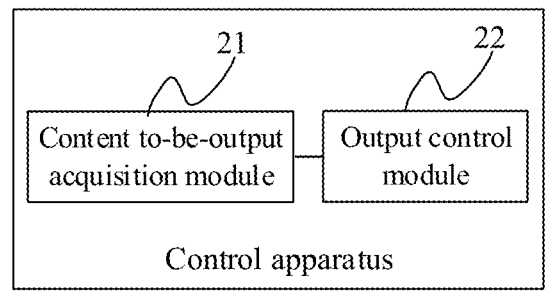
FIG. 10 is a schematic structural diagram of an example control apparatus consistent with the present disclosure.

The present disclosure provides a control apparatus. FIG. 10 is a schematic structural diagram of an example control apparatus in one embodiment. As shown in FIG. 10, the control apparatus includes: a content-to-be-output acquisition module 21, configured to acquire the first task contents to be output; and an output control module 22, configured to detect that the first display area outputs the second task contents, and map the first task contents to the second display area for output.

In some embodiments, when the output control module 22 detects that the first display area outputs the second task contents, the apparatus may further include at least one of a first determination module or a second determination module.

The first determination module may be configured to determine whether the first task contents or the second task contents satisfy a display switching condition, and trigger the output control module 22 to map the first task contents to the second display area for output.

The second determining module may be configured to determine that the first display screen where the first display area is located is in a full-screen working mode, and trigger the output control module 22 to map the first task contents to the second display area for output.

In some embodiments, the output control module 22 may include at least one of a first determination unit, a second determination unit, a third determination unit, or a fourth determination unit.

The first determining unit may be configured to determine that the first task contents and the second task contents come from different content sources.

The second determining unit may be configured to determine that the first task contents and the second task contents correspond to different tasks of a same content source.

The third determining unit may be configured to determine that the first task contents come from a content source of a first type.

The fourth determining unit may be configured to determine that the second task contents come from a content source of a second type.

Figure 11:
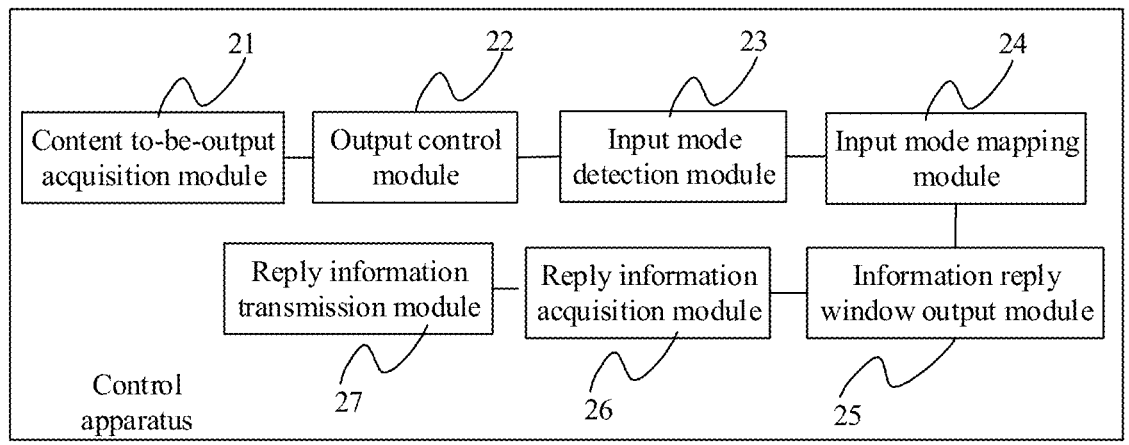
FIG. 11 is a schematic structural diagram of another example control apparatus consistent with the present disclosure.

In some other embodiments, as shown in FIG. 11, the apparatus may further include an input mode detection module 23 and an input mode mapping module 24.

The input mode detection module 23 may be configured to detect a first input mode mapped to the second task contents, and determine whether there is a second input mode in an idle state.

The input mode mapping module 24 may be configured to map the second input mode to the second display area.

In some other embodiments, the apparatus may further include an output state maintaining module configured to maintain the first task contents in an output state.

In one embodiment, when the first task contents are notification contents to be replied to, as shown in FIG. 11, the apparatus may further include: an information reply window output module 25, configured to output an information reply window for the first task contents in the second display area according to the second input mode mapped to the second display area; a reply information acquisition module 26, configured to obtain reply information for the first task contents in response to an information input operation on the information reply window; and a reply information transmission module 27, configured to send the reply information to the notifier terminal.

Figure 12:
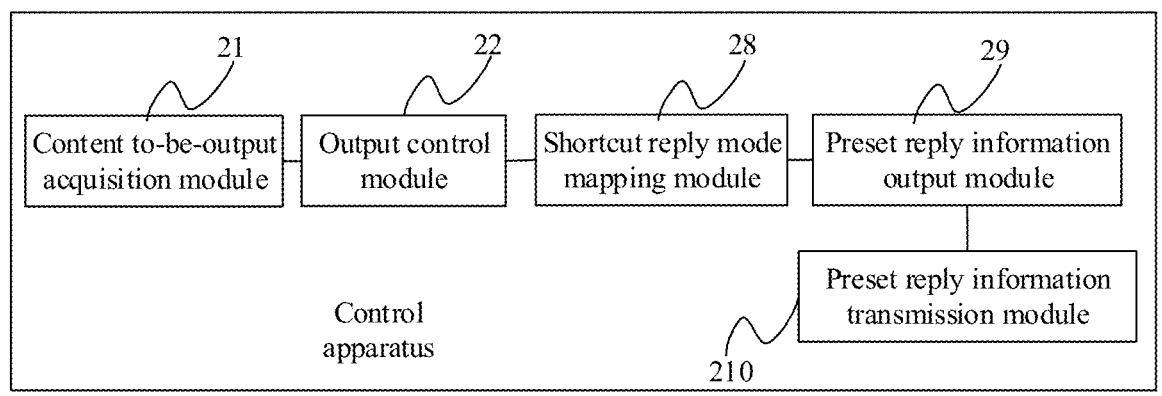
FIG. 12 is a schematic structural diagram of another example control apparatus consistent with the present disclosure.

In some other embodiments, as shown in FIG. 12, when the first task contents are the notification contents to be replied to, the apparatus may further include: a shortcut reply mode mapping module 28, configured to map the shortcut reply mode to the second display area; a preset reply information output module 29, configured to output a shortcut reply window corresponding to the first task contents in the second display area corresponding to the shortcut reply mode, and display preset reply information in the shortcut reply window; and a preset reply information transmission module 210, configured to send triggered preset reply information to the notifier terminal in response to a triggering operation on the preset reply information.

In some embodiments, the apparatus may further include a third determining module, configured to determine that all the input modes are mapped to the second task contents and trigger the shortcut reply mode mapping module 28 to map the shortcut reply mode to the second display area.

It should be noted that various modules or units in the above apparatus embodiments may be program modules stored in a memory, and a processor may execute the above program modules stored in the memory to realize corresponding functions. For the functions implemented by the program modules and their combinations, and the technical effects achieved, reference may be made to the descriptions of the corresponding parts of the foregoing method embodiments, and details are not repeated in this embodiment.

The present disclosure also provides a computer-readable storage medium on which a computer program can be stored, and the computer program can be loaded and executed by a processor to implement the control method described in the foregoing embodiment, and the implementation process is not described in detail in this embodiment.

It should be noted that, in the above-mentioned embodiments, unless the context clearly indicates an exception, the words "a," "an," "and/or," or "the" do not specifically refer to the singular, and may also include the plural. Generally speaking, the terms "comprising" or "including" only imply that the clearly identified steps and elements are included, and these steps and elements do not constitute an exclusive list, and the method or apparatus may also include other steps or elements. The inclusion of an element by the phrase "comprising a . . . " does not preclude the presence of additional identical elements in the process, method, article of manufacture or apparatus that includes the element.

In the description of the embodiments of the present disclosure, unless otherwise specified, "/" means or. For example, "A/B" may mean A or B. "and/or" is only a description of an association relationship of objects, and may indicate that there may be three kinds of relationships. For example, "A and/or B," may indicate that A exists alone, A and B exist at the same time, or B exists alone. In addition, in the description of the embodiments of the present disclosure, "plurality" may mean to two or more.

Terms such as "first," "second" in the present disclosure are only for descriptive purposes and are used to distinguish one operation, unit or module from another operation, unit or module, and do not necessarily require or imply there is any such actual relationship or order between these units, operations or modules. They also cannot be understood as indicating or implying relative importance or indicating the number of technical features indicated. Thus, a feature associated with "first" or "second" may expressly or implicitly include one or more of this feature.

In addition, the various embodiments in the present disclosure are described in a progressive or juxtaposed manner, and each embodiment focuses on the differences from other embodiments, and the same and similar parts between the various embodiments may be referred to each other. For the apparatuses and electronic devices disclosed in the embodiments, since they correspond to the methods disclosed in the embodiments, the descriptions are relatively simple, and reference may be made to the descriptions of the methods for relevant parts.

The above description of the disclosed embodiments enables those skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments shown herein, but is to be accorded the widest scope consistent with the principles and novel features disclosed herein.

What is claimed is:

1. A control method comprising:
    obtaining a first task content;
    in response to detecting that a first display area outputs a second task content, mapping the first task content to a second display area for output;
    detecting a first input mode mapped to the second task content;
    determining whether there is a second input mode in an idle state; and
    in response to the first task content being a notification content to be replied to, and in response to determining that the second task content is mapped to all input modes and there is no input mode in the idle state, mapping a shortcut reply mode to the second display area,
    wherein:
        the first display area and the second display area are different display areas in a same display screen; or
        the first display area and the second display area are on different display screens and each include at least a partial display area of one of the different display screens.

2. The method according to claim 1, wherein mapping the first task content to the second display area for output includes:
    in response to determining that at least one of the first task content or the second content meets a display switching condition, mapping the first task content to the second display area for output.

3. The method according to claim 2, wherein determining that the at least one of the first task content or the second content meets the display switching condition includes at least one of:
    determining that the first task content and the second task content are from different content sources;
    determining that the first task content and the second task content correspond to different tasks of a same content source;
    determining that the first task content is from a content source of a first type; or
    determining that the second task content is from a content source of a second type.

4. The method according to claim 1, wherein mapping the first task content to the second display area for output includes:
    in response to determining that a first display screen where the first display area is located is in a full-screen working mode, mapping the first task content to the second display area for output, the second display area including at least a partial display area of a second display screen.

5. The method according to claim 1, further comprising, in response to the first task content being the notification content to be replied to:
    according to the second input method mapped to the second display area, outputting an information reply window for the first task content in the second display area;
    in response to an information input operation on the information reply window, obtaining reply information for the first task content; and
    sending the reply information to a notifier terminal.

6. The method according to claim 1, further comprising, in response to the first task content being the notification content to be replied to and after mapping the first task content to the second display area for output:
    maintaining the first task content in an output state.

7. The method according to claim 1, further comprising, in response to the first task content being the notification content to be replied to:
    outputting a shortcut reply window for the first task content and corresponding to the shortcut reply mode in the second display area, and presetting reply information in the shortcut reply window; and
    in response to a trigger operation on the preset reply information, sending a triggered preset reply information to a notifier terminal.

8. The method according to claim 1, further comprising:
    in response to determining that there is the second input mode in the idle state, mapping the second input mode to the second display area.

9. An electronic device comprising:
    at least one memory storing a program; and
    at least one processor configured to execute the program to:
        obtain a first task content;
        in response to detecting that a first display area outputs a second task content, map the first task content to a second display area for output;
        detect a first input mode mapped to the second task content;
        determine whether there is a second input mode in an idle state; and
        in response to the first task content being a notification content to be replied to, and in response to determining that the second task content is mapped to all input modes and there is no input mode in the idle state, mapping a shortcut reply mode to the second display area,
    wherein:
        the first display area and the second display area are different display areas in a same display screen; or
        the first display area and the second display area are on different display screens and each include at least a partial display area of one of the different display screens.

10. The electronic device according to claim 9, wherein the at least one processor is further configured to execute the program to:

in response to determining that at least one of the first task content or the second content meets a display switching condition, map the first task content to the second display area for output.

11. The electronic device according to claim 10, wherein the at least one processor is further configured to execute the program to perform at least one of:
   determining that the first task content and the second task content are from different content sources;
   determining that the first task content and the second task content correspond to different tasks of a same content source;
   determining that the first task content is from a content source of a first type; or
   determining that the second task content is from a content source of a second type.

12. The electronic device according to claim 9, wherein the at least one processor is further configured to execute the program to:
   in response to determining that a first display screen where the first display area is located is in a full-screen working mode, map the first task content to the second display area for output, the second display area including at least a partial display area of a second display screen.

13. The electronic device according to claim 9, wherein the at least one processor is further configured to execute the program to, in response to the first task content being the notification content to be replied to:
   according to the second input method mapped to the second display area, output an information reply window for the first task content in the second display area;
   in response to an information input operation on the information reply window, obtain reply information for the first task content; and
   send the reply information to a notifier terminal.

14. The electronic device according to claim 9, wherein the at least one processor is further configured to execute the program to, in response to the first task content being the notification content to be replied to and after mapping the first task content to the second display area for output:
   maintain the first task content in an output state.

15. The electronic device according to claim 9, wherein the at least one processor is further configured to execute the program to, in response to the first task content being the notification content to be replied to:
   output a shortcut reply window for the first task content and corresponding to the shortcut reply mode in the second display area, and presetting reply information in the shortcut reply window; and
   in response to a trigger operation on the preset reply information, send a triggered preset reply information to a notifier terminal.

16. The electronic device according to claim 9, further comprising:
   at least one input device; and
   at least one display screen.

17. The electronic device according to claim 9, wherein the at least one processor is further configured to execute the program to:
   in response to determining that there is the second input mode in the idle state, map the second input mode to the second display area.

* * * * *